United States Patent Office 3,781,264
Patented Dec. 25, 1973

3,781,264
PROCESS FOR TEXTURIZING MICROBIAL CELLS BY ALKALI-ACID TREATMENT
Cavit Akin, Oakbrook, Ill., assignor to Standard Oil Company, Chicago, Ill.
No Drawing. Filed Oct. 29, 1970, Ser. No. 85,282
Int. Cl. C07g 7/00; D01f 9/04
U.S. Cl. 260—112 R          8 Claims

ABSTRACT OF THE DISCLOSURE

Protein-containing single cel micro-organisms are prepared into texturized products by a process in which an aqueous slurry of protein-containing microbial cells is mixed with an acid or alkaline activating agent to activate the cell mixture after which the activated mixture of protein-containing microbial cells and activating agent is passed through an acid bath, if an alkaline activating agent is employed, or through an alkaline bath, if an acid activating agent is employed, the acid bath having a pH in the range of about 3.5 to 5.5 and the alkaline bath having a pH in the range of about 7.5 to 10.5. The texturized protein product prepared by the process is suitable for use as an additive to or a substitute for conventional foods. In addition, the protein products prepared by the process are suitable, for example, in the preparation of bio-degradable containers, packaging materials, and utensils.

BACKGROUND OF THE INVENTION

This invention relates generally to protein-containing single cell micro-organisms, and more particularly, to a process for inducing texture formation in protein-containing single cell micro-organisms so that texturized products prepared by the process can be used as additives to or substitutes for natural foods or as biodegradable articles.

Recent emphasis on the need for new sources of protein products suitable for human consumption has led to the development of a number of bio-synthetic processes for the production of protein. Typically, the bio-synthetic production of protein is accomplished through the growth of micro-organisms on hydrocarbon or other substrates. It is known, for example, that micro-organisms, such as bacteria and yeast, which are grown by single cell reproduction, contain high proportions of proteins and can be utilized directly in foods as a whole cell material or can be treated to recover protein isolates. It has been shown that micro-organisms grown on hydrocarbon substrates can be successfully utilized in animal feeds; but, as yet, these micro-organisms have not been rendered commercially acceptable for use in food preparations suitable for human consumption.

Illustrative of the bio-synthetic processes for cultivating micro-organisms, such as yeasts, molds, and bacteria, is the process described in U.S. Pat. No. 3,271,266 where microorganisms are grown in the presence of a petroleum fraction containing straight chain hydrocarbons, an aqueous nutrient medium and a gas containing free oxygen. Other suitable processes for the bio-synthetic production of micro-organisms include the cultivation processes described in U.S. Pats. Nos. 3,268,413 and 3,384,491.

One major reason for the observed unsuitability of biosynthetic protein-containing micro-organisms (sometimes referred to herein as single-cell protein or microbial cells) in food products is the lack of texture inherent in such products. When present in an aqueous solution, for example, such protein-containing micro-organisms comprise a plurality of separate and isolated individual cells.

Generally, single-cell protein is initially produced as a wet paste and then subsequently converted into dry powder form. This dry powder, similar in appearance and feel to flour, lacks the texture, i.e., rigid or flexible coherent structure, and food-like sensation to the mouth, necessary to make it attractive as a food product. Moreover, when placed in water, the powdered single-cell protein material rapidly reverts back into single cell form.

This observed inability to form a rigid or flexible coherent texturized structure from single-cell protein is further complicated by the extremely small size of the individual protein-containing cells. Known texturization techniques for inducing texture formation in soybean or cottonseed based protein materials, for example, which contain molecular size protein particles, utilize the solubilization of molecular proteins and desolventization of the solubilized proteins to induce texture formation. Typically, such conventional techniques are inapplicable to single-cell protein texturization problems because of the 0.2 to 10 micron size of the individual cells and the absence of solvents for single-cell proteins.

SUMMARY OF THE INVENTION

According to this invention, a process is provided for imparting desirable textural properties to single-cell protein materials, e.g., microbial cells. In general, the texturization process involves: mixing an aqueous slurry of protein-containing microbial cells with an acid or alkaline activating agent, and then passing the mixture of protein-containing microbial cells and activating agent through an acid or alkaline bath, e.g., an acid bath if an alkaline activating agent is used and an alkaline bath if an acid activating agent is used.

More specifically, suitable alkaline activating agents include alkali metal hydroxides, sodium carbonate, sodium bicarbonate, ammonia and the like, and suitable acid activating agents include hydrochloric acid, phosphoric acid, citric acid, acetic acid, lactic acid and the like. The activating agent is mixed with an aqueous slurry of microbial cells to activate the cells. Typically, about 0.5 to 15 percent by weight alkali metal hydroxide, ammonia, sodium carbonate, sodium bicarbonate, or acid, based upon the combined weight of activating agent and microbial cells, is mixed with the aqueous slurry to accomplish the desired results.

The deactivation bath, either acid or alkaline depending upon the type activating agent, used in the second step of the texturization process normally comprises either an acid selected from the group consisting of hydrochloric acid, phosphoric acid, citric acid, acetic acid and lactic acid, in water or a base such as sodium carbonate, sodium bicarbonate, or ammonia. Other components, such as ethanol, sodium chloride, glycerol and monoglycerides, can be used in combination with the acids or bases and water as well.

The texturized microbial cell products prepared by the process of this invention have the highly desirable properties of chewiness, crispness, and the ability to resist dispersion in water. This latter characteristic is particularly meaningful since the primary drawback of single-cell protein materials, namely, the reversion back into a plurality of individual cells when placed in water, has been reduced by the process of this invention and in the products produced therefrom.

The texturized single cell protein products of this invention, moreover, can be readily shaped into a variety of fibrous forms, films or the like and can simulate to a remarkable extent the chewiness and texture of cooked meats and snacks, both in mouth feel and appearance. This ability to closely simulate natural food protein products it more pronounced when intact or partially leaked microbial cells are treated by the process of this invention when compared with texturized soybean or cottonseed protein materials which merely provide a textile-like texture of molecular fibres only.

Accordingly, the practice of this invention results in the preparation of single-cell protein products having the unique physical properties required to render such products useful as additives to or substitutes for natural foods and the products so obtained are edible and biodegradable. Moreover, texturization can now be accomplished quickly and easily with a reduced amount of physical equipment and process steps for previously un-texturizable single-cell protein materials. Finally, the texturized products of this invention can be made into highly porous protein materials capable of fat and water adsorption.

DESCRIPTION OF THE PREFERRED EMBODIMENTS

Before proceeding with a more detailed discussion of the various embodiments of this invention, an explanation is set forth of the usage and meaning of certain terms which have been relied on in defining the invention.

The term "texture," for example, is used herein to refer to a rigid or flexible coherent mass of individual cells which can be readily formed into various sizes, shapes and configurations and which is non-dispersible in water (e.g., are not subject to reversion back into a plurality of separate and distinct individual cells).

The term "shaping," as used herein, refers to and includes any physical operation, such as slicing, chopping, extruding, pressing, molding, or the like, which causes the activated mixture of microbial cells to adopt and hold a particular shape or configuration.

The term "polycellular," as used herein, refers to the interconnected cellular state of a plurality of individual microbial cells wherein a sufficient number of intercellular bonds are formed between individual cells to cause a resistance in the ability of the combined mass of cells to revert back into individual cells. In this sense, polycellularization is analogous to polymerization on the molecular state.

The term "chewiness" refers to a particular physical state of the texturized protein products of this invention which causes such products when chewed in the mouth to have the physical properties of resilience, elasticity and resistance to shear.

The process of this invention is especially designed to provide a method for imparting polycellular characteristics and properties to protein-containing micro-organisms grown by known commercial fermentation processes. In various embodiments of this invention, the cell harvest from a commercial fermentor, as for example the crude, moisture-containing product cake recovered from a centrifuge or filter, serves as a suitable starting material for the process.

Any living microbial cell materials, however, can be treated according to the process of this invention. In a fully integrated, continuous system, the microbial cells are conveniently grown in a first fermentation stage where oxygen and a suitable substrate such as liquid or gaseous hydrocarbons or carbohydrates together with a nutrient solution containing vitamins and minerals are fed to a stirred reactor containing micro-organisms. The growth rate of micro-organisms on the hydrocarbon or other substrate is typically exponential. As the micro-organism concentration increases, a portion of the reaction mixture is withdrawn from the stirred reactor and the micro-organisms separated from the withdrawn reaction mixture. Included among the various processes suitable for preparing starting materials used in the practice of this invention are the processes described in U.S. Pats. Nos. 3,384,491; 3,271,266; and 3,268,413.

By way of illustration, bacteria such as those listed in Table I, yeasts such as those listed in Table II, and fungi such as those listed in Table III are suitable micro-organisms for use as starting materials.

TABLE I.—SUITABLE BACTERIA

| | |
|---|---|
| Acetobacter sp. | Corynebacteria sp. |
| Arthrobacter sp. | Micrococcus sp. |
| Bacillus subtilus | Pseudomonas sp. |

TABLE II.—SUITABLE YEASTS

| | |
|---|---|
| Candida curvata | Oidium lactis |
| Candida lipolytica | Pichia pastoris |
| Candida parapsilosis | Pichia haplophyla |
| Candida pulcherima | Saccharomyces carlsbergensis |
| Candida utilis | |
| Hansenula anomala | Saccharomyces fragilis |
| Hansenula wickerhamii | Trichosporon cutaneum |
| Hansenula miso | Saccharomyces cerevisiae |

TABLE III.—SUITABLE FUNGI

| | |
|---|---|
| A. niger | A. itaconicus |
| A. glaucus | P. notatum |
| A. oryzae | P. chrysogenum |
| A. flavus | P. glaucum |
| A. terreus | P. griseofulvum |

Candida utilis, Saccharomyces cerevisiae, Saccharomyces fragilis, and Saccharomyces carlsbergensis are preferred starting materials for the process of this invention, however, because each is F.D.A. approved for use in food products.

In each of the embodiments of this invention, the single cells are typically in the form of an aqueous slurry or paste prior to treatment. The aqueous slurry of single-cell protein materials obtained from fermentation, for example, normally has a cell concentration in the range of about 0.5 to 4 percent by weight cells based on the total weight of the slurry. Accordingly, it is desirable to concentrate the aqueous slurry or paste prior to undertaking the other steps involved in the texturization process. Concentration can normally be accomplished by means such as centrifuging, drying, and the like, for a time sufficient to obtain the desired cell concentration.

It has been found that cell concentrations in the range of about 5 to 30 percent by weight cells based on the total weight of the cell slurry or paste are desirable for use in the process of this invention. Preferably, however, cell concentrations in the range of 10 to 15 percent by weight cells based on total weight of the cell slurry or paste are especially desired because such slurries or pastes have excellent flow characteristics during the treatment process.

Turning now to the various embodiments of this invention, it should be noted that the process of this invention concerns in part the recognition that protein-containing, single-cell micro-organisms can be surprisigly imparted with texture by subjecting slurries of such micro-organisms to an alkali-acid or acid-alkali treatment. In general, texturization can be accomplished by first mixing an aqueous slurry of microbial cells with an acid or alkaline activating agent and then passing the mixture through an acid bath when an alkaline activting agent is employed or an alkaline bath when an acid activating agent is employed.

In the case of an alkaline activating agent, such as alkali metal hydroxides, ammonium hydroxide, ammonia, sodium carbonate or sodium bicarbonate, it has been observed that addition of the alkaline activating agent to an aqueous slurry of microbial cells causes a rapid increase in the viscosity of the resultant mixture. Typically, sufficient alkaline activating agent is added to the cell slurry to cause a 2 to 9-fold increase in the viscosity of the mixture over the initial viscosity of the aqueous cell slurry. In some instances, it is desirable to heat the activated cell slurry as the viscosity increases to maintain adequate flow characteristics.

In the case of an acid activating agent, such as hydrochloric acid, acetic acid, lactic acid, citric acid or phosphoric acid, addition of activating agent to the aqueous cell slurry causes a rapid decrease in the viscosity of the resultant mixture. Typically, sufficient acid activating agent is added to the cell slurry to decrease the viscosity of the mixture to ¼ to ½ the original viscosity of the aqueous cell slurry.

After either acid or alkaline activation, the activated cell slurry is passed through a deactivation bath where cell polycellularization results and a texturized product is obtained.

In practice, a concentrated cell slurry having about 5 to 30 percent by weight microbial cells, based on the total combined weight of cells and water, is placed in a stirred reactor and then mixed with about 0.5 to 20 percent by weight of an acid or alkaline activating agent based upon the combined weight of activating agent and microbial cells. Sodium and potassium hydroxide, ammonia, ammonium hydroxide, sodium carbonate and sodium bicarbonate are preferred alkaline activating agents because of their ready availability and relatively low cost. Likewise, hydrochloric acid, phosphoric acid, citric acid, lactic acid and acetic acid are preferred acid activating agents.

After the activating agent has been added to the concentrated aqueous cell slurry, the mixture of cells, water and activating agent is stirred until a suitable increase or decrease, as the case may be, in the viscosity of the mixture occurs. Typically, a viscosity increase of about 2 to 9 times the initial viscosity of the aqueous cell slurry is achieved when an alkaline activating agent is used in the practice of this invention and a viscosity decrease of about ¼ to ½ the initial viscosity of the aqueous cell slurry is achieved when an acid activating agent is used in the practice of this invention. Then the activated mixture so obtained is shaped in an extruder or the like, or cast into films, molded, pressed or shaped and passed into a deactivating bath. The particular shape of the activated mixture emitted from the extruder, for example, determines the shape of the ultimate texturized product formed by the process.

Normally, the final texturized product is desirably shaped in the form of thin fibers or threads which are similar in shape and appearance to meat fibers or alternatively in the form of a film. It should be understood, however, that shaping is not a necessary step in the practice of this invention and that an unshaped product can be just as easily passed through the deactivation bath for polycellular texture formation.

In any event, after the viscous alkaline activated mixture, in shaped or unshaped form, is removed from the stirred reactor, it is passed through an acid bath. The acids found to be suitable for use in the acid bath include hydrochloric acid, phosphoric acid, citric acid, acetic acid and lactic acid. Other acids usually employed in food product technology are also suitable for use in the acid bath.

Alternatively, after the acid-activated low viscosity mixture, in shaped or unshaped form, it is removed from the stirred reactor and passed through an alkaline bath. The bases found to be suitable for use in the alkaline bath include alkali metal hydroxides, ammonium hydroxide, ammonia, sodium carbonate, and sodium bicarbonate.

It has been found that particularly advantageous results are accomplished when an alkaline activating agent is used in combination with an acid bath selected from the following group: (a) about 0.3 to 11.0 percent by weight acetic acid in water, (b) about 0.25 to 6.0 percent hydrochloric acid in water, (c) about 0.2 to 10.0 percent by weight acetic acid with about 50 percent by weight ethanol in water, (d) about 0.3 to 10.0 percent by weight acetic acid with about 0.2 to 10.0 percent by weight sodium chloride in water, (e) about 0.3 to 10.0 percent by weight acetic acid with about 1.0 to 12.0 percent by weight glycerol in water, and (f) about 0.25 to 5.0 percent by weight hydrochloric acid with about 1.0 to 8.0 percent by weight monoglycerides in water.

Although ambient temperatures can be employed during the entire texturization process, it is desirable to maintain the temperature of the activated cell slurry at about 30° to 100° C. and the temperature of the acid bath at about 20° to 40° C. when a highly textured product with excellent physical properties is desired. In addition, the pH of the acid bath is maintained in the range of about 3.5 to 5.5 while the pH of the alkaline bath is maintained in the range of about 7.5 to 10.5.

After the activated mixture of cells and acid or alkaline activating agent has been passed through a suitable deactivation bath, the texturized product can be shaped further if desired and then dried. Drying is accomplished, for example, by removing product from the acid bath and passing hot air over the product for a time sufficient to remove water or by conventional infrared or vacuum drying techniques.

It should be understood, however, that the deactivation step which renders the activated cell slurry polycellular can also be accomplished without passing the activated mixture through a deactivation bath. Thus, for example, the deactivating material can be applied to shaped or unshaped activated cell pastes or slurries by spraying, vaporization, coating or the like without actually passing the activated mixture through a bath. In fact, in some instances it has been found that polycellularization can occur without any post-activation treatment other than mere exposure to air. When ammonia is used as an activating agent, for example, it has been found that polycellularization occurred without passing the activated mixture through an acid bath.

All of the unique polycellular, texturized products prepared by the process of the invention are characterized by being non-dispersible in water. When viewed under a microscope, for example, the texturized products of this invention have a rigid or flexible coherent structure in which a plurality of individual cells are in a closely packed arrangement. When placed in water, the products do not revert back into single-cell form but rather retain their polycellular structure. In the case of fiber-shaped products, an extremely close similarity is observed between the fibers so produced and meat fibers. Products having various non-fiber shapes, however, are found to be equally suitable for use in a wide range of food products and food intermediates, such as high protein snack products and bakery products and can be mixed with various food dyes and additives.

The process and products of this invention are illustrated in the following examples. All parts and percentages are by weight unless otherwise indicated.

EXAMPLE I

About 100 g. of 25% dry weight Torula yeast paste was mixed in a mortar with 1 gram of powdered KOH. The paste mixture was then allowed to stand at room temperature for 30 minutes. Next, the paste was extruded through a syringe into an acetic acid bath at a pH of 4.5 to form fibers of about 0.2 to 2 mm. in diameter. The fibers were recovered and dried under a current of air at room temperature. The dry fibers were brittle and became soft but did not disperse into single cells when placed in water.

One advantage of this procedure was that a textured product was obtained without totally solubilizing the single cells.

EXAMPLE II

About 100 g. fresh Torula yeast paste, 25% dry weight, was mixed with 10 ml. 20% NaOH solution in water. The mixture was heated to 70° C., held at this temperature for 15 minutes, and then cooled to room temperature. The cold mixture was extruded into a 4.5 pH acetic acid bath to form 0.2 to 0.4 mm. diameter fibers. The fibers were recovered and washed with 70% ethanol in water at room temperature until the washings did not have an acid reaction. The washed fibers were dried in a vacuum oven at 50° C. The fibers obtained were white and brittle, and did not disperse into single cells when soaked in water.

EXAMPLE III

A 10 g. sample of *Candida utilis* paste (20% dry weight) was suspended in about 20 ml. of 1% $Na_2CO_3$ solution in water. The suspension was boiled for about 15 minutes, then cooled to room temperature and centrifuged. Next, the residue was collected in the form of a paste. The paste was spread as a thin film (1 mm. thick) in a glass Petri dish. About 2 ml. of 1 M HCl was sprinkled over the film until a bubbly mixture was obtained accompanied by the release of $CO_2$ gas. The acid treated mixture was dried at 70° C. and a spongy textured, slightly flexible polycellular product was obtained. The dry product absorbed 2 to 4 times its weight in water and 2 to 3 times its weight in oil. The product became soft but did not disperse into single cells when soaked in water.

One advantage of this procedure was that a spongy, porous textured polycellular product was obtained.

EXAMPLE IV

About 10 gram spray dried Torula yeast was mixed with about 1 gram $NaHCO_3$ powder in a mortar. About 30 ml. distilled water was added to the mixture and a paste was prepared. The paste was kept at about 100° C. for 15 minutes and then cooled to room temperature. The paste was placed in a "Waring Blender" together with a mixture of 8 ml. ethanol, 2 ml. distilled water, and 1 ml. concentrated HCl. The mixture was then stirred at the top blender speed for 1 minute. Then, the whipped mixture was spread with a spatula over an aluminum dish to form a 0.5 cm. thick layer and then dried at 100° C. The product was light brown in color, had a microporous texture, could absorb 2 to 6 times its weight in water and 2 to 4 times its weight in oil. The dry product became soft but did not disperse into single cells when soaked in water.

One advantage of this procedure was that a polycellular product having a microporous texture was obtained. The pore size could be controlled to some extent by regulation of the whipping time and whipping speed in the blender.

EXAMPLE V

The procedure at Example IV was repeated, except that the whipped mixture was freeze-dried. The product obtained was almost white in color, was flexible, and became soft and flaked off but did not disperse into single cells when soaked in water.

One advantage of this procedure was that a light colored product was obtained.

EXAMPLE VI

The procedure at Example V was repeated, except that the freeze-dried product was heated at about 70° C. for about 4 minutes. The heat-treated product remained light colored, did not flake off nor disperse into single cells when placed in water.

EXAMPLE VII 10 ml. 12% Torula yeast slurry was mixed with 1 ml. concentrated ammonia (about 30% $NH_3$), and the mixture was boiled for 15 minutes. The mixture was then cooled to room temperature and centrifuged. Next, the residue was spread over a glass dish and dried in air at 70° C. temperature. A light olive colored film was obtained. The film was slightly flexible, and did not disperse into single cells when soaked in water.

One advantage of this process was that a texturized product was obtained without acid treatment.

EXAMPLE VIII

The procedure of Example VII was repeated, except that the ammonia-treated residue was bleached by mixing it with 0.2 ml. of 3% $H_2O_2$ solution in water at room temperature prior to preparing the film. The product was practically white in color and did not disperse into single cells when placed in water.

EXAMPLE IX

A 10 ml. 16% slurry of butane culture was mixed with about 0.2 gram KOH. A viscous suspension was obtained at room temperature. The viscous suspension was extruded into a 4.5 pH acetic acid bath to form 0.2 to 2 mm. diameter fibers. The fibers were recovered and dried under vacuum at 65° C. The dry fibers did not disperse into single cells when soaked in water.

EXAMPLE X

Bakers' yeast paste (about 27% dry weight) was suspended in 0.1 NaOH solution to form a 10% cell slurry. The mixture was kept at 100° C. for 15 minutes and then cooled to room temperature. The mixture was centrifuged, and the residue obtained was extruded into a 5% solution of acetic acid in ethanol to form fibers of 0.2 to 1 mm. diameter. Next, the fibers were recovered and dried under vacuum at 50° C. The dry fibers were then washed with ethanol and dried under air current at 50° C. The dry fibers were white in color, had a bland taste, had a brittle texture, and did not disperse into single cells when placed in water, but rather maintained their fibrous form.

EXAMPLE XI

The procedure of Example X was repeated, except that a 2.5% HCl solution in ethanol was used as the acid bath. The product obtained had a slightly bitter taste.

EXAMPLE XII

The procedure of Example X was repeated, except that a 2.5% phosphoric acid ($H_3PO_4$) solution in ethanol was used as the acid bath. The product obtained had a slight metallic taste.

EXAMPLE XIII

The procedure of Example X was repeated, except that 5% lactic acid solution in ethanol was used as the acid bath. The dry product was slightly flexible and it had a mild lactic acid taste.

EXAMPLE XIV

The procedure of Example X was repeated, except instead of ethanol, a 5% glycerol solution in ethanol was used in washing the fibers. The dry product was flexible and had a mild, sweet taste.

EXAMPLE XV 100 g. brewers' yeast slurry (about 15% dry weight), fresh from the fermentor, was mixed with 2 g. NaOH and boiled for about 10 minutes. The mixture was cooled to room temperature and centrifuged. The residue was washed once with a 2% NaOH solution at room temperature. Then the washed residue was extruded into a 5% acetic acid bath which contained 20% water, 5% glycerol, 5% acetic acid, 70% ethanol by volume. The extrusion was made at room temperature. About 0.1 to 1 mm. diameter fibers were obtained from the extrusion. The fibers were recovered and dried under vacuum at 80° C. Examination of the dry fibers showed that they were flexible, had a light acetic acid taste, but were not bitter. The fibers became soft but maintained their shape and did not disperse into single cells when placed in water.

One advantage of this procedure was that the debittering and texturizing were accomplished in a one-step treatment of the brewers' yeast.

EXAMPLE XVI 10 g. spray dried commercial Torula yeast was mixed with 100 ml. 3% $NH_3$ solution in water. The mixture was autoclaved at 14.5 p.s.i. and 120° C. for 10 minutes and then cooled to room temperature. Next, the mixture was centrifuged and the residue obtained was extruded into a 4.5 pH acetic acid bath at room temperature to form fibers having about 0.1 to 2 mm. diameters. Then the fibers were recovered and dried under an infra-red lamp. The dry product was light brown in color and crisp in texture. It did not disperse into single cells when placed in water.

EXAMPLE XVII 10 ml. 10% *Candida utilis* suspension, fresh from the fermentor, was mixed with 0.25 ml. concentrated hydrochloric acid. The resultant mixture was boiled for about 10 to 30 minutes under atmospheric pressure. Then, the mixture was cooled to room temperature and centrifuged. The residue obtained was extruded into a pH 8.6 NaOH bath to form 0.1 to 2 mm. diameter fibers. Then, the fibers were recovered and washed with 70% ethanol in water solution at room temperature. The washed fibers were dried at 90° C. The dry product was brittle; it retained its fibrous texture and did not disperse into single cells when soaked in water.

EXAMPLE XVIII 100 g. spray dried Torula yeast was mixed with 30 ml. of 2% NaOH solution. The mixture was extruded at 70° C. to form a ribbon of about 0.2 to 1 mm. thickness and of about 1 cm. to 2 cm. width. The ribbon was then cut into pieces of about 1 to 2 cm. in length. The cut pieces of cell ribbon were then placed in a desiccator which was saturated with acetic acid vapor. After 30 minutes the pieces were removed from the desiccator and salt (NaCl) flakes were sprinkled on their surface. The salted product was dried at about 150° to 200° C. until it was light brown in color. The resultant dry product had a pleasant, crisp and chewy texture, and a mild salty taste and had the characteristics of snack foods from a texture point of view.

EXAMPLE XIX

About 10 gram spray dried Troula yeast sample was mixed with 35 ml. of 30% $NH_3$ solution in water and extruded at 80° C. in the form of a ribbon of 0.2 to 0.5 mm. thickness and of 1 cm. to 2 cm. width. The ribbon was cut into a plurality of 1 to 2 cm. long pieces. Next, the cut pieces were sprinkled with a mixture of red lake dye, citric acid, and artificial bacon flavor. The red colored ribbon pieces were allowed to stand at room temperature for about 5 minutes and then salt flakes were sprinkled over them. The ribbon pieces were dried in the 175° to 200° C. oven until the product became crisp. The dry product had a crisp and chewy texture. It became soft in water but did not disperse into single cells.

EXAMPLE XX

About 100 g. spray dried *Saccharomyces fragilis* was mixed with 40 ml. of 3% KOH solution in water at room temperature. The mixture was extruded to form about 0.2 to 0.5 mm. diameter fibers. The fibers were then soaked five minutes in a deactivation bath which contained 5% acetic acid, 2% monoglyceride, and 50% ethanol in water, and was kept at 35° C. The fibers were then recovered and dried at 70° C. under vacuum. Next, the dry fibers were steamed until their surface became moist and then salt flakes were sprinkled over them. The salted fibers were pressed gently with a spatula to form a mat without breaking the fiber structure. The mat was then heated 6 minutes in an oven at a temperature of 150° to 175° C. The product obtained had a light brown color and the appearance of shredded wheat. It had a chewy, crisp texture and a mild yeast-like taste.

It should be understood that a number of modifications and changes in the embodiments discussed herein can be made without departing from the spirit and scope of this inventiton as defined in the claims.

I claim:

1. A process for preparing a polycellular, texturized protein product from a plurality of individual protein-containing single-cell micro-organisms, said product being substantially non-dispersible in water, comprising the steps of:
    (a) preparing an aqueous slurry of individual single-cell micro-organisms, having a cell concentration of from about 5 to about 30 wt. percent;
    (b) adding to said slurry, with mixing, an alkaline activating agent, selected from the group consisting of alkali metal hydroxides, aqueous ammonia, sodium carbonate and sodium bicarbonate, in an amount within the range from about 0.5 to about 20 wt. percent based on the combined weight of activating agent and single-cell micro-organisms;
    (c) continuing the mixing of slurry and activating agent until the viscosity of the mixture is within the range from about 2 to about 9 times the initial viscosity;
    (d) extruding said viscous mixture of cells and alkaline activating agents; and
    (e) treating the extruded mixture with an aqueous acidic solution, said acid in acid acidic solution being selected from the group consisting of hydrochloric acid, phosphoric acid, citric acid, acetic acid and lactic acid;

whereby a closely-packed, polycellular, texturized protein structure is achieved affording a fibrous product suitable for inclusion in food products and food intermediates.

2. The process of claim 1 wherein the treating of said extruded mixture of alkaline activating agent and aqueous slurry of single-cell micro-organisms is carried out by passing said mixture through an aqueous acidic bath maintained at a pH within the range from about 3.5 to about 5.5

3. The process of claim 1 wherein the treating of said extruded mixture of alkaline activating agent and said aqueous slurry of single-cell micro-organisms is carried out by spraying said mixture with an aqueous acidic solution having a pH within the range from about 3.5 to about 5.5

4. The process of claim 1 wherein the quantity of alkaline activating agent mixed with said aqueous slurry of single-cell micro-organisms is within the range from azout 0.5 to about 15 percent by weight based on the combined weight of activating agent and single-cell micro-organisms.

5. The process of claim 4 wherein said extruded mixture of alkaline activating agent and aqueous slurry of single-cell micro-organisms is passed through an aqueous acidic bath wherein the acid contained in said acidic bath is selected from the group consisting of hydrochloric acid, citric acid, phosphoric acid, acetic acid and lactic acid, and the pH of the acidic bath is maintained within the range from about 3.5 to about 5.5.

6. The process of claim 5 wherein said acidic bath is selected from the group consisting of:
    (a) from about 0.3 to about 11.0 percent by weight acetic acid in water;
    (b) from about 0.25 to about 6.0 percent by weight hydrochloric acid in water;
    (c) from about 0.2 to about 10.0 percent by weight acetic acid and about 50 percent by weight ethanol in water;
    (d) from about 0.3 to about 10.0 percent by weight acetic acid and from about 0.2 to about 10 percent sodium chloride in water;
    (e) from about 0.5 to about 10.0 percent by weight acetic acid and about 1 to about 12 percent glycerol in water; and, (f) from about 0.25 to about 5 percent by weight hydrochloric acid and from about 1 to about 8 percent by weight monoglycerides in water.

7. The process of claim 5 wherein said protein-containing single-cell micro-organisms are selected from the group consisting of *Candida utilis, Saccharomyces carlsbergensis Saccharomyces cerevisiae,* and *Saccharomyces fragilis.*

8. The texturized product prepared by the process of claim 7.

References Cited

UNITED STATES PATENTS

| | | | |
|---|---|---|---|
| 2,541,803 | 2/1951 | Wormell | 264—202 |
| 3,177,079 | 4/1965 | Kuramoto et al. | |
| 3,171,831 | 3/1965 | Town. | |
| 3,239,501 | 3/1966 | Stankovics et al. | |
| 3,268,412 | 8/1966 | Champagnat et al. | |
| 3,347,688 | 10/1967 | Frankenfeld et al. | |
| 3,356,518 | 12/1967 | Gilboe et al. | |
| 3,394,015 | 7/1968 | Giacino. | |
| 3,468,669 | 9/1969 | Boyer et al. | |
| 3,585,179 | 6/1971 | Samejima et al. | |
| 3,607,293 | 9/1971 | Furukawa et al. | |
| 3,615,654 | 10/1971 | Ayukawa | 99—1 |
| 3,493,386 | 2/1970 | Pyne | 99—17 |
| 3,662,671 | 5/1972 | Hoer | 99—17 |
| 3,662,672 | 5/1972 | Frederiksen et al. | 99—17 |

OTHER REFERENCES

"Textbook of Biochemistry," by Staunton et al., pp. 342–346, 4th ed., 1969, MacMillan Co.

JAY H. WOO, Primary Examiner

U.S. Cl. X.R.

99—14; 106—124; 264—202